Nov. 1, 1932.  W. H. SMYTH  1,885,486
CONVERTIBLE TRACTOR
Filed March 19, 1929   2 Sheets-Sheet 2

INVENTOR:
William H. Smyth

Patented Nov. 1, 1932

1,885,486

UNITED STATES PATENT OFFICE

WILLIAM H. SMYTH, OF BERKELEY, CALIFORNIA

CONVERTIBLE TRACTOR

Application filed March 19, 1929. Serial No. 348,229.

My invention relates to motor and other vehicles. It has for its main object to combine in one vehicle the functional advantages of the tracklayer and the round-wheel type. While the tracklayer assembly alone broadly distinguishes the self-laying-track type from the "roundwheeler" form of vehicle, each character of vehicle operates under very dissimilar conditions and has widely different functions. The tracklayer tractor type, characteristically, is slow moving; it is intended to operate on unprepared and naturally rough and uneven ground; its main function is to overcome great resistance at slow speed. The roundwheel vehicle, characteristically, is fast moving; it is intended to operate on prepared roadways which are normally smooth and free from obstructions; its main function is to overcome light resistance at high speed.

A motor-vehicle intended to overcome large resistance at slow speed on unprepared ground needs great power, weight and large tractive ground-abutment contact—hence the sprocket-wheel driven endless track-chain with its load supporting tread-plates and their anchoring caulks. Present accepted practice in these matters renders the tracklayer-tractor operatively incalculable and uneconomical on ordinary unprepared land; incalculable, because hummocks and hollows constantly vary the wheel-base length and draw-bar pull; and uneconomical, because a costly motor element must be provided of power commensurate with full length wheel-base maximum draw-bar pull of level land tractive contact.

Under the accepted (sprocket-wheel and cog-chain drive) tracklayer practice, the intrusion of rocks and compacting ground material between the sprockets and chain cog-abutments is a serious cause of delay, breakage and replacement expense. The track-chain makes front-wheel steering impractical and rear-wheel steering and uneven ground introduce liability to derailment of the support-wheels; operating on uneven ground—the load being borne on a succession of supporting truck-wheels intermediate of the sprocket- and idler-wheel—causes constantly varying tractive effect and serious torsion stresses on the track-chain hinges, in the ground run. The upper run of the track-chain travels at twice the advance speed of the machine, which fact in connection with sprocket-wheel drive and present practice as regards upper- and ground-run, causes the tracklayer to be notoriously a noisy machine. In military service this noise is very undesirable.

The round wheel vehicle calls for simplicity of running gear and silent cushion-tire wheels. It also calls for a limitation of dead load to the lowest practical limit; and, though intended for normally smooth road service, the "roundwheeler" must be capable of surmounting occasional ground inequalities and accidental obstructions resiliently and without destructive jars.

In a convertible machine the diverse functional characteristics and operative requirements peculiar to each type must be provided for in such wise that the constructive features intended for operation in one form shall not interfere with the functional requirements and constructive necessities of the other.

In general the object of the present invention is a vehicle adapted to function effectively under both tracklayer and "roundwheeler" conditions of operation, possessing "roundwheeler" advantages, but lacking the stated undesirable tracklayer features and the parts so constructed and arranged as to be applicable to standard makes of tractors.

More specifically, some of the objects of the invention are to provide in a combination vehicle, a traction-assembly such that the load bearing wheel-base remains of constant and of maximum effective length, regardless of varying surface contour and hence of full and predictable pulling power on unprepared ground surfaces; that the tracklayer load-bearing wheel-base shall be the same length as that of the vehicle when operating as a "roundwheeler" while relieving the ground-run of the track-chain of load-support duty; that, (whether functioning as a tracklayer or as a "roundwheeler") the vehicle shall be practically noiseless in operation and so simple in construction that conversion from tracklayer into "roundwheeler," or the reverse can be quickly effected during ordinary commercial use in the field or on the road. Another object is to reduce to a minimum, operative torsional stresses and to protect from the intrusion of dirt and other deleterious ground material, the track surfaces and hinged joints in ground-run of the track. A further object is to make the improvement applicable to standard tracklayer tractors without materially affecting their general design or present method of manufacture.

A typical expression of my invention which accomplishes these objects is illustrated in the accompanying drawings wherein.

Figure 1:
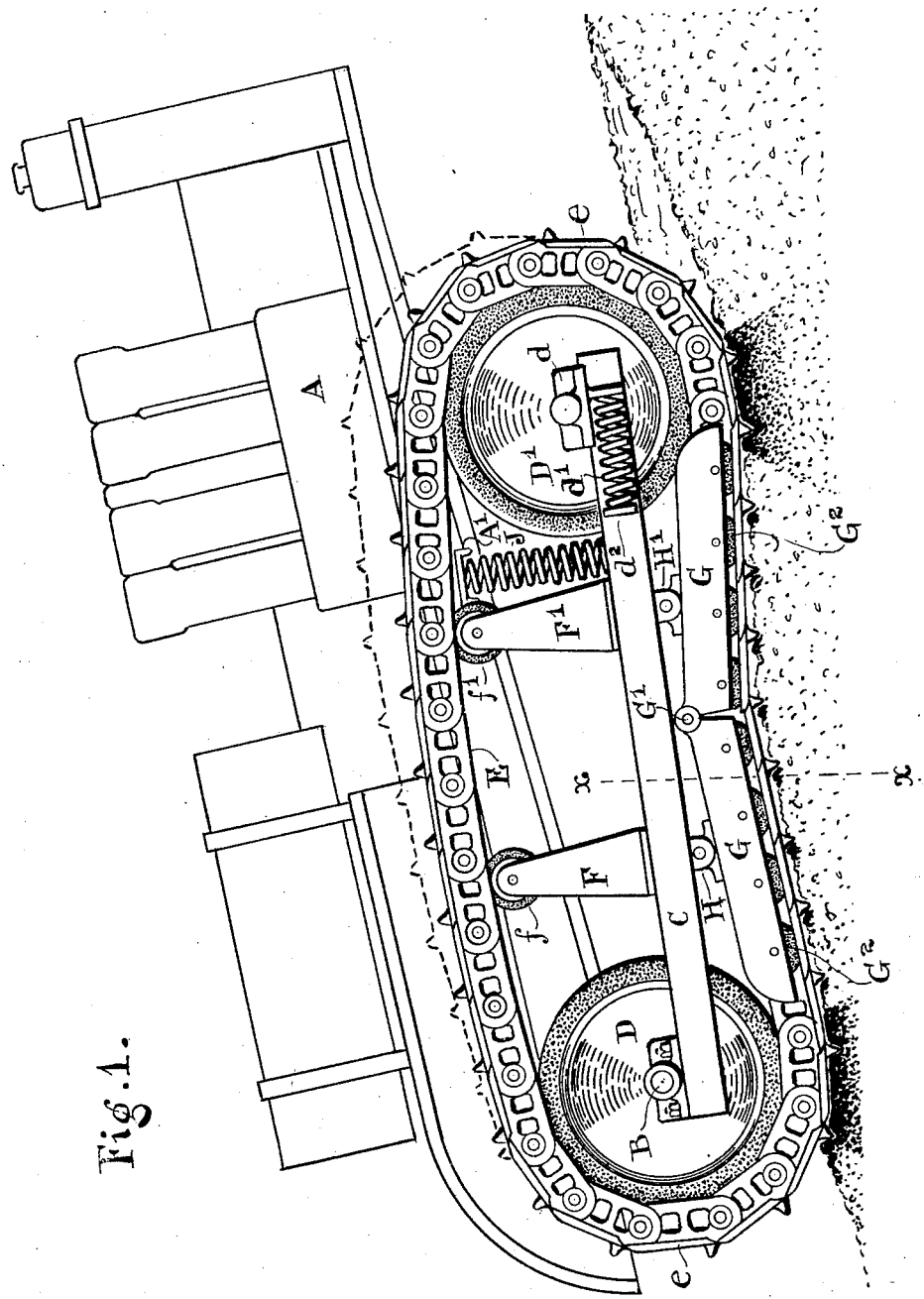
Fig. 1 is a side elevation of the tractor as a tracklayer working uphill on rough ground showing tractive contact of the ground run of the track chain over the whole length of the wheel-base.

As the traction-assembly alone broadly distinguishes the self-laying-track type from the "roundwheeler" form of vehicle and the power and steering elements being within the knowledge of mechanics skilled in this art and both sides substantially alike, I will confine my description to one side, and to those parts directly affected by my invention. The motor means and main frame being of standard design and not essentially involved, I have indicated these by outline drawing, as more detailed delineation would tend to obscure, rather than to clarify the real subject matter of this disclosure.

With this understanding and referring to the drawings: A, represents the power element having a transverse power shaft B. The traction assembly frame C, is shown herein as consisting of beams $c$, $c^1$, Fig. 2, pivoted near the rear end upon power shaft B. Upon power shaft B, is secured a supporting and driving wheel D, adapted to ordinary locomotion on a normal road surface shown in Fig. 1, as a cushion tire load-wheel. Near the opposite end of frame C, is journaled a second support-wheel $D^1$, substantially similar to D, and spaced apart therefrom to constitute a two-point-support wheel-base for the frame C. Journal boxes $d$, for the axle of the support-wheel $D^1$, are slidable on frame C. Between box $d$, and a suitable abutment $d^2$, on frame C, is provided a tension spring $d^1$. Trained around the support-wheels D, $D^1$, is an endless track-chain E, provided with suitable laterally extended tread shoes $e$, shown best in Fig. 2. Its inner or track surface is provided with a way or channel $e^1$, of suitable shape to conform to the transverse section of the periphery of the support-wheels D, $D^1$. The wheels D and $D^1$ act as the main support of the load of the vehicle on the track chains.

Figure 2:
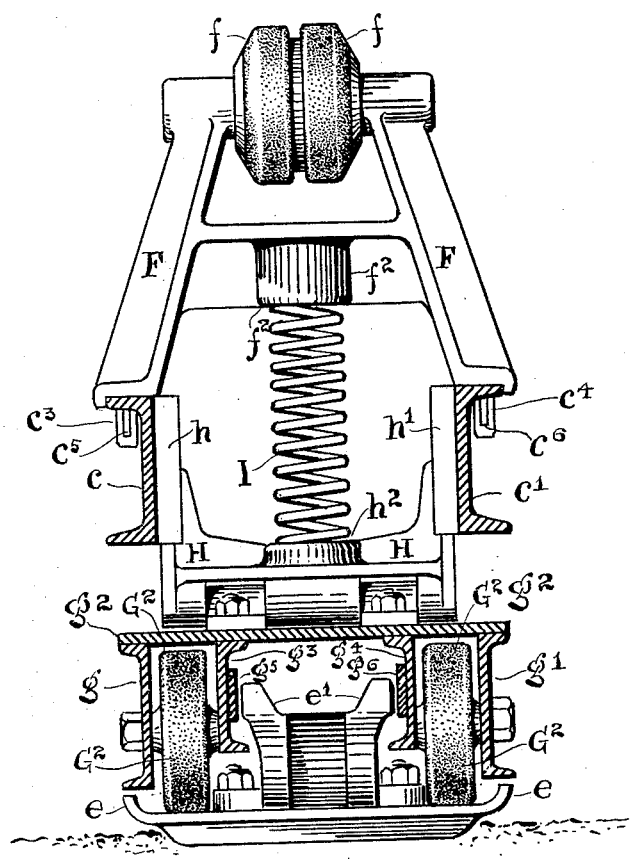
Fig. 2 is an elevation (on an enlarged scale) of the tracklayer assembly with parts removed for clearness of illustration, and sectioned on line $x$—$x$ of Fig. 1.

Intermediate the support-wheels D, $D^1$, and resting upon the side members $c$, $c^1$, of frame C, are standards F, $F^1$, in the upper ends of which are journaled respectively cushion tire support rollers $f$, $f^1$, for the upper run of track chain E. The standards F, and $F^1$, are secured to the side members of frame C, by dowel pins $c^3$, $c^4$, extending downwardly through the frame members $c$, and $c^1$, respectively and secured in place by key members $c^5$, $c^6$, as shown in Fig. 2.

A track-chain guide G, is provided, forming a tunnel like structure over the ground-run of track chain E, shown as formed of side plates $g$, $g^1$, with a connecting cover plate $g^2$, secured thereto. Intermediate the plates $g$, $g^1$, may be provided plates $g^3$, and $g^4$, attached to and depending from the plate $g^2$, paralleling the side plates $g$, $g^1$. Journaled on the track-chain guide G, are track rollers $G^2$, preferably cushion tired and adapted to roll upon the laterally extended portion of the tread-shoes $e$, in the ground run of the track-chain shown clearly in Fig. 2. The track chain guide G, is preferably formed in sections hinged together intermediate of its ends as shown at $G^1$. Extending upwardly from the track chain guide G, are slidable members H, $H^1$, movable vertically in guides $h$, $h^1$, preferably attached to the side members $c$, $c^1$, respectively of frame C, as shown in Fig. 2. The lower ends of slides H, $H^1$, are suitably hinged to the track chain guide G, to permit it to accommodate itself to varying ground contour. Interposed between the slides H, $H^1$, and the standards F, and $F^1$, are springs I, seated in suitable abutment sockets $h^2$, $f^2$.

On the inner surfaces of the plates $g^3$, $g^4$, may be secured lateral abutment wearing strips $g^5$, $g^6$.

Attached to the frame of the motor element A, is an abutment $A^1$, and between this and the frame C, is a strong spring J, to resiliently support the forward end of the motor element.

In Fig. 1, the tractor is shown working up hill on rough ground and is intended to indicate that it is working under heavy duty approximating the tractive limit of its ground contact and power limit of its motor. The track assemblies (one of which is indicated in dotted outline) are encountering different ground contours. As shown in Fig. 1, the hinged track chain guide G, accommodates itself to the unevenness of the ground contour (whether of hummock or hollow) and maintains tractive contact with the ground over the whole length of the wheel-base. Under such like conditions of operation a tracklayer tractor of standard construction, the track assemblies would have unequal tractive ground contact, causing the side having the lesser contact to dig in and mire itself. And this digging in effect is still more pronounced when surmounting the crown of a hummock.

As indicated in Fig. 1, the springs I, are relatively weak, being only of sufficient strength to slightly embed the caulks of the tread shoes in the ground for traction. Thus, torsion of the chain, due to laterally uneven ground is reduced to a minimum as the chain can yield upwardly bodily, responsive to the unevenness of the ground. For substantially the same reasons, the laterally widely spaced-apart cushion-tire rollers $G^2$, relieve the tread-shoes of stresses to which they are normally subjected in standard makes of tractors. The track-chain guide G, with its side members $g$, $g^1$, Fig. 2, extending downwardly from the cover plate $g^2$, into close proximity to the upwardly curved edges of the tread shoes $e$, constitute therewith a tunnel like housing for the track chain in its ground run, to the exclusion of dirt, rocks, and other deleterious ground material. The inner plates $g^3$, $g^4$, of the track-chain guide G, with their renewable wearing strips $g^5$, $g^6$, constitute guides and abutments which prevent the lateral displacement of, and hence laterally bending stresses on, the ground run of the chain when the vehicle is turning or the track is otherwise subjected to side pressure. As indicated in Fig. 1, (by the darker shading of the ground section under the wheels D, $D^1$,) the motor element is always supported on the wheels D, $D^1$, regardless of the varying ground contour. Both figures of the drawings also show that all wheels which contact with the track-chain have cushion tires, thus preventing the noise and clatter incident to the travelling endless chain contacting with metallic truck wheels, or chain support-wheels, or sprocket- and idler-wheels. This cushion-tire wheel arrangement in both ground run, upper run and driving support-wheels, renders the machine practically noiseless. The laterally extended positioning of the rollers $G^2$, $G^2$, together with their easy upward displacement permits the tread shoes $e$, to be made of less weight and strength than when reliance is placed upon their inherent strength to support the load of the machine on laterally uneven ground as is customary in present practice. This lightening of the tread-shoes greatly reduces the gross weight of the track chain, an important matter both as regards construction cost and operative economy of power.

To transform the tracklayer into a "round-wheeler" it is only necessary to disconnect the endless track chains and lay the thus uncoupled chains on the ground, knock out the keys $c^5$, $c^6$, and take out the hinge pins of the slides H. The standards F, $F^1$, the chain guides G, and the slides H, thus become removable. The box $d$, is then secured in place by the customary means as shown in the box of the wheel D, and the whole vehicle having thus been relieved of a large proportion of its dead weight, can then roll off the extended track chains as a four wheeled, cushion-tire road vehicle.

In view of these radical departures from present accepted practice and construction, I do not desire to be limited to the particular expression of my invention used herein for illustrative purposes, nor limited in any way other than in accord with a liberal interpretation and the reasonable import of the claims which follow.

I claim:

1. In a track assembly for vehicles, a frame with support-wheels journaled thereon, a track-chain trained around the support-wheels, a track-chain guide laterally paralleling the ground run of the chain with rollers journaled on the guide adapted to control the flexure of the track-chain.

2. In a track assembly for vehicles, a frame with support-wheels journaled thereon, a track-chain trained around the support-wheels, a flexibly hinged track-chain guide laterally paralleling the ground run of the chain with rollers journaled thereon adapted to control the flexure of the track-chain.

3. In a track assembly for vehicles, a frame with support-wheels journaled thereon, a track-chain trained around the support-wheels, a flexibly hinged spring opposed track-chain guide laterally paralleling the ground run of the chain with rollers journaled on the guide adapted to resiliently control the flexure of the track-chain.

4. In a track assembly for vehicles, a frame with support-wheels journaled thereon, a track-chain trained around the support-wheels, a track-chain guide enclosing the track-chain on three sides paralleling the ground run of the chain with rollers journaled on the guide adapted to control the flexure of the track-chain.

5. In a track assembly for vehicles, a frame with support-wheels journaled thereon, a track-chain trained around the support-wheels, a track-chain guide laterally paralleling the ground run of the chain with cushion-tire rollers journaled thereon adapted to control the flexure of the track-chain.

6. In a track assembly for vehicles, a frame with support-wheels journaled thereon, a track-chain trained around the support-wheels with laterally extended tread shoes, a track-chain guide paralleling the ground run of the chain with rollers journaled on the guide laterally travelable on the laterally extended tread shoes adapted to control the flexure of the track-chain.

7. In a track assembly for vehicles, a frame with support-wheels journaled thereon, a track-chain trained around the support-wheels with laterally extended tread shoes, a track-chain guide enclosing the track-chain on three sides paralleling the ground run of the chain with rollers journaled on the guide travelable on the laterally extended tread shoes adapted to control the flexure of the track-chain.

8. In a track assembly for vehicles, a frame with support-wheels journaled thereon, a track-chain trained around the support-wheels with laterally extended tread shoes, a track-chain guide enclosing the track-chain on three sides paralleling the ground run of the chain with cushion-tire rollers journaled on the guide travelable on the laterally extended tread shoes adapted to control the flexure of the track-chain.

9. In a track assembly for vehicles, a frame with support-wheels journaled thereon, a track-chain trained around the support-wheels with laterally extended tread shoes, a flexibly hinged spring opposed track-chain guide laterally paralleling the ground run of the chain with cushion-tire rollers journaled on the guide travelable on the laterally extended tread shoes adapted to control the flexure of the track-chain.

10. A tracklayer assembly for vehicles comprising a frame pivoted near one end, a cushion-tire support-wheel journaled on the frame adjacent to the pivot, a substantially similar support-wheel journaled on the frame adjacent to its free end, a track-chain trained around the support-wheels in friction driven circumferential contact, a track-chain guide laterally paralleling the ground run of the chain with rollers journaled on the guide adapted to control the flexure of the track-chain.

11. A tracklayer assembly for vehicles comprising a frame pivoted near one end, a cushion-tire support-wheel journaled on the frame adjacent to the pivot, a substantially similar support-wheel journaled on the frame adjacent to its free end, a track-chain trained around the support-wheels in friction driven circumferential contact, tread-shoes secured to the chain and laterally extended on each side thereof, a flexibly-hinged spring-opposed track chain guide paralleling the ground run of the chain with cushion-tire rollers journaled on the guide rollable on the laterally extended tread shoes adapted to control the flexure of the track-chain.

12. A tractor comprising motor means including a transverse power shaft, a frame one of its ends pivoted on the power shaft, a cushion-tire support-wheel secured on the power shaft, a substantially similar support-wheel journaled on the frame adjacent to its free end, a track-chain trained around the support-wheels in friction driven circumferential contact, cushion-tire rollers adapted to support the upper run of the track-chain, tread shoes secured to the chain and laterally extended on each side thereof, a flexibly hinged spring opposed track-chain guide paralleling the ground run of the chain with cushion-tire rollers journaled on the guide rollable on the laterally extended tread shoes adapted to control the flexure of the track-chain, a substantially similar track assembly on the other side of the motor and means adapted to resiliently support the forward end of the motor.

13. A convertible tractor comprising a frame, motor means thereon, cushion-tire support-wheels journaled on the frame, a track-chain with laterally extended tread shoes trained around the support-wheels in friction driven circumferential contact, a track-chain guide with rollers journaled on the guide rollable upon the laterally extended tread shoes in the ground run, rollers adapted to support the upper run and means adapted to detachably position the track-chain guide.

14. A convertible tractor comprising a frame, motor means thereon, cushion-tire support-wheels journaled on the frame, a track-chain with laterally extended tread shoes trained around the support-wheels in friction driven circumferential contact, a flexibly hinged spring opposed guide paralleling the chain wth cushon-tire rollers journaled on the guide rollable on the laterally extended tread-shoes in the ground run, cushion-tire rollers adapted to support the upper run and means adapted to detachably position the track-chain guide.

WILLIAM H. SMYTH.